Patented Feb. 13, 1934

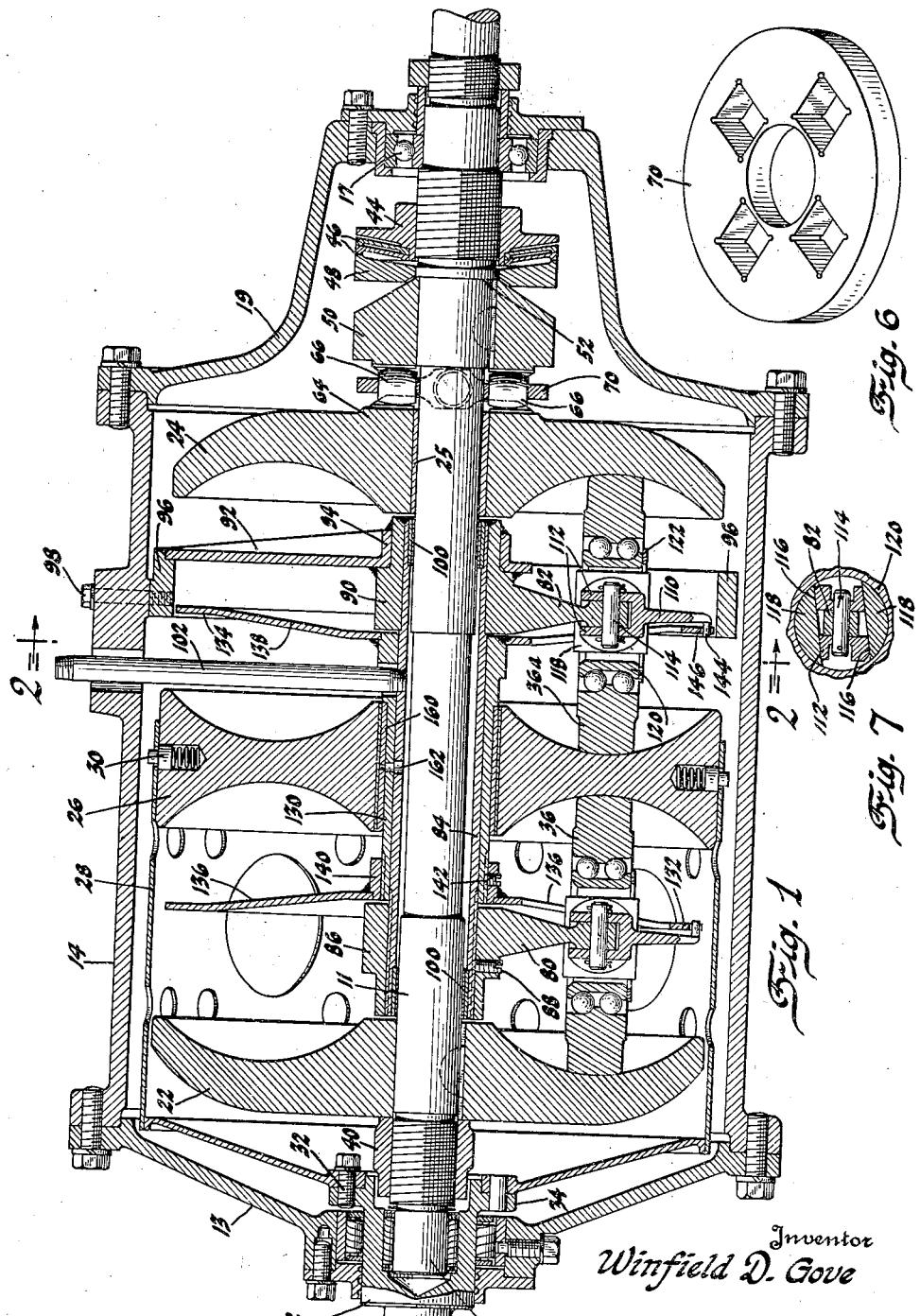
Feb. 13, 1934.  W. D. GOVE  1,947,044
FRICTION TRANSMISSION
Filed June 11, 1931  2 Sheets-Sheet 1
Inventor
Winfield D. Gove

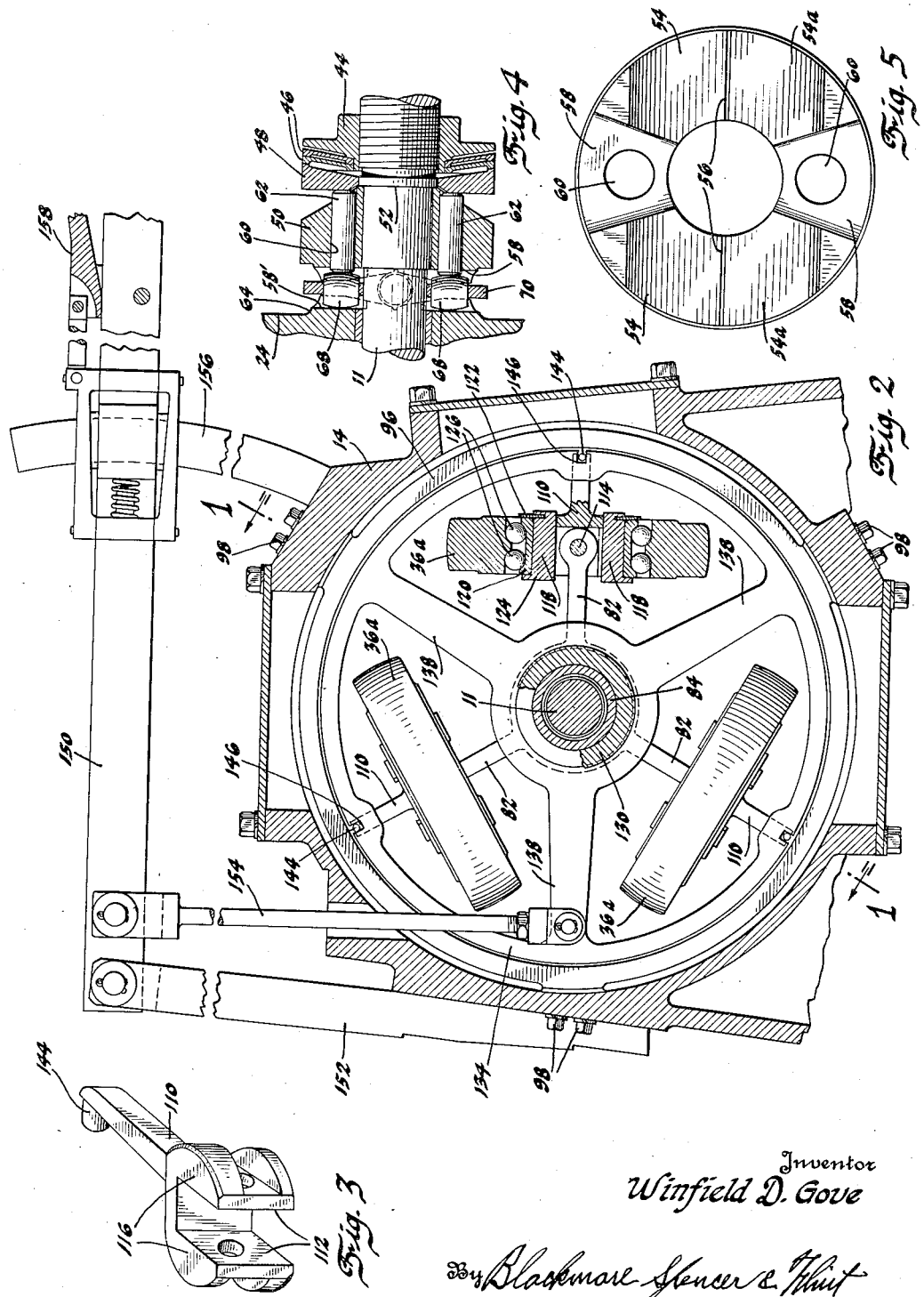

1,947,044

UNITED STATES PATENT OFFICE 1,947,044

FRICTION TRANSMISSION

Winfield D. Gove, Detroit, Mich., assignor to General Motors Research Corporation, Detroit, Mich., a corporation of Delaware Application June 11, 1931. Serial No. 543,633

12 Claims. (Cl. 74—200)

This invention relates to variable speed power transmission mechanisms including two members, one of which is adapted to be driven by the other through interposed elements comprising as essentials a disk and one or several friction rollers having tractive peripheral engagement with a face of the disk and susceptible of adjustment to establish the path or paths of tractive contact at any radial distance from the disk axis within the limits of adjustment permitted.

Transmissions embodying this invention are adapted particularly for use in motor vehicles to transmit the rotations of an engine shaft to the road wheels so that the latter may be rotated at any velocity desired with respect to the velocity of the engine shaft within the limits established.

In this invention the rate of revolution of the power output or driven member may be changed, with respect to the rate of revolution of the power input or driving member, by inclining each roller in a plane transverse of the axis of the disk about an axis passing thru the roller center and the point of tractive contact of roller and disk in order that each roller may then automatically travel in a spiral path on the face of the disk, until the desired path of contact nearer to or farther from the disk axis has been reached; thus the necessity of sliding the peripheral surface of the roller over the face of the disk to vary the relative velocities of driving and driven members is avoided.

The phrase low speed-ratio is used herein to indicate a lower rate of revolution of the power output member with respect to the power input member and the phrase high speed-ratio is used to indicate a higher rate of revolution of the power output member with respect to the power input member.

A principal object is to utilize the yield of roller supports to tractive forces exerted between disk and rollers in such manner as to lower the speed-ratio position of any overloaded roller by automatically adjusting a ratio control device.

Other objects are to improve the form of roller supports; to improve the ratio control devices, and otherwise to promote control and simplify the elements of friction transmissions.

The said objects among others are attainable by means of an exemplary mechanism illustrated and specifically described hereinafter. The exemplary mechanism comprises a power input or driving shaft and a power output or driven shaft in axial alinement; two spaced apart disks, hereinafter designated driven races with opposed toroidal bearing surfaces, hereinafter designated raceways, connected to the driven shaft to rotate therewith; one disk, hereinafter designated a driving race, provided with a toroidal raceway in each face, interposed between the driven races and connected to the driving shaft by means compelling it to be rotated thereby; and rollers interposed between the driving and driven races. The driving race with oppositely facing toroidal raceways is, of course, the equivalent of two oppositely facing driving races connected to the driving shaft. Between the opposed raceways of the driving and driven races are two series of rollers arranged in parallel having their peripheries in tractive engagement with the raceways of the driving and driven races and their extended axes normally intersecting the main axis, that is, the axis of the alined shafts and races. Each roller is positioned by an elastic arm capable of yielding in a plane normal to the axis of said shafts and races under the influence of driving torque. Each roller is free to rotate on a trunnion bearing, supported by the end of a positioning arm, so as to transmit rotation from the driving to a driven race. Each roller also is free to tilt in a plane including the main axis and the roller center so as to vary the velocity of the power output or driven shaft with respect to that of the power input or driving shaft. Each roller may also be inclined, as stated,—thus causing the line of its axis to pass to one side of the main axis, in order to bring into effect the forces that cause tilting,—by means of a ratio control arm extending radially outward from the trunnion of the roller bearing and engaged by a ratio control arm actuating member susceptible of being operated manually or otherwise. If the ratio control arm actuator be held stationary yielding of an elastic supporting arm will incline the roller positioned by said arm.

Obviously, the driving and driven members may be reversed in function if desired; and suitable means may be provided for pressing the driving and driven races toward one another to procure adequate traction between the races and rollers.

In the accompanying drawings, in which like parts are indicated by like reference characters throughout the several views, Fig. 1 is a longitudinal section, on the plane indicated by line 1—1 Fig. 2, of an encased transmission mechanism embodying this invention;

Fig. 2 is a transverse section thereof on a plane indicated by line 2—2, Fig. 1;

Fig. 3 is an enlarged detail view of a composite trunnion member and roller inclining arm for initiating change of ratio;

Fig. 4 is a view in section of a spring and torque loading device shown in Fig. 1, but on a section plane making an angle of 90 degrees with the section plane of Fig. 1;

Fig. 5 is a view on a larger scale of bearing faces of one of the members with which the rollers of the spring and torque loading device coact;

Fig. 6 is a perspective view on a larger scale of a cage for the rollers of said loading device, and Fig. 7 is a sectional view through the trunnion of a roller.

Describing now the specific embodiment illustrated as a whole in Figs. 1 and 2, numeral 10 indicates a shaft, assumed to be a power input or driving member, which is disposed in axial alinement with a shaft 11 assumed to be a power output or driven member. The axes of these shafts constitute the main axis of the transmission. Shaft 10 has an enlarged end 12 journaled in a bearing in one of the end covers 13 of a housing body 14. A reduced end 15 of shaft 11 is piloted in a bore within the enlarged end part 12 of shaft 10 so that shaft 11 may rotate freely with respect to shaft 10. Bearing rollers may be interposed between the cylindrical surface of the pilot end 15 of shaft 11 and the interior surrounding wall of said bore if desired. The said bearing should be such as will permit of slight endwise movement of shaft 11 with respect to shaft 10. Shaft 11 is also supported in a bearing 17 in the other end cover 19 of said housing body 14. Races 22 and 24 are connected to shaft 11 in such manner that the races will be compelled to rotate with said shaft. Between the races 22 and 24, race 26 is disposed coaxial with shaft 11 and free to be rotated relatively thereto. Race 26 is in driving connection with shaft 10 by means of a cup-like drum, spider, or equivalent coupling 28 pinned or otherwise suitably connected at one end to the perimeter of said race as indicated at 30, and bolted or otherwise rigidly secured as at 32 to a flange 34 on the enlarged end 12 of shaft 10. The coupling 28, as shown, embraces or surrounds the race 22. Rotation of shaft 10, therefore, imparts rotation directly to race 26, which has opposite friction bearing surfaces one of which faces the bearing surface of race 22 and the other faces the bearing surface of the race 24. One series of rollers 36 is interposed between the bearing faces of races 22 and 26, and another series of rollers 36a is interposed between the bearing faces of races 24 and 26, in such manner that the peripheries of the rollers have tractive engagement with the bearing surfaces. The bearing surfaces of the races are shown as torical grooves constituting raceways, and the peripheries of the rollers as suitably curved in their axial plane to engage effectively the torical raceways. The rollers are supported, adjusted and maintained in effective tractive engagement with the raceways by means presently to be described.

Race 22 is keyed to shaft 11 adjacent its pilot-bearing end and is susceptible of axial adjustment by means of collar or nut 40 threaded on said shaft. Collar 40 functions as an abutment for resisting any tendency of race 22 to move away from race 26, and for moving race 22 toward race 26 in the event of any longitudinal movement of shaft 11 away from shaft 10. Race 24 is free to move longitudinally and rotatively with respect to shaft 11, except as these movements are prevented by the rollers 36 and 36a interposed between the disks and by the loading devices to be described. A bushing 25 may be interposed between race 24 and shaft 11.

The loading devices, illustrated in Figs. 1, 4, 5 and 6, function to maintain adequate tractive contact between races and rollers by applying an axial force between shaft 11 and race 24, tending to cause the races 22 and 24 to approach. A spring abutment 44 is shown in Figs. 1 and 4 as adjustably mounted by means of screw threads on shaft 11 within the housing at its power delivery end. One or more dished annular springs 46, of a type commonly known as Belleville washers, are interposed between the adjustable abutment 44 and an axially movable collar 48, so that the latter is elastically urged toward the race 24. A strong annular torque loading member 50 is keyed to shaft 11 between a shoulder 52 on the shaft and the race 24. The face of member 50 toward the race 24 has two symmetrically disposed pairs of inclined or cam surfaces, each pair consisting of oppositely inclined faces 54, 54a, which meet at the sunken apex in a diametrical line indicated at 56 in Fig. 5. Disposed symmetrically at right angles to the apex line 56 are diametrically opposite plane surfaces 58, normal to the main axis, intersected by holes 60 parallel with the main axis and having their centers in the same diametrical plane. Holes 60 are occupied by slidable pins 62 protruding slightly from the holes at each end, one end of each pin contacting with the axially movable spring pressed collar 48, whereby the pins are forced elastically toward the race 24, and the other end contacting with rollers to be described presently.

The back of race 24 is provided with a boss 64, the surface of which is a replica in contour of the face of member 50, described. There are no holes, however, in the race corresponding to holes 60 in member 50.

Disposed diametrically opposite each other between the cam or inclined surfaces 54, 54a of torque loading member 50 and the corresponding surfaces on race 24, are two rollers 66, of barrel-like contour. Ninety degrees from the rollers 66 are diametrically opposite rollers 68 which also are shown as of barrel-like contour although said rollers 68 may be plain cylinders since the surfaces on which they roll are parallel planes normal to the axis. The rollers, for illustrative purposes, are shown curved on a shorter radius than they should be in practice. Rollers 68 ride between the ends of pins 62 and the plane surface 58' on race 24 and thus transmit to the race the elastic pressure of springs 46, which may be adjusted by the abutment nut or collar 44. Spring pressure is, therefore, exerted to clamp the transmission rollers 36 and 36a between the middle race 26 and end races 22 and 24. As the load on the output or driven shaft increases the tendency of race 24 to move angularly with respect to torque loading member 50 increases. Relative rotation of race 24 and member 50 causes an approach of faces 54a of one toward faces 54 of the other. As member 50 is rigid with shaft 11 and race 24 is movable thereon both axially and angularly, while rollers 66 are interposed between said faces 54 and 54a, a relative axial movement of shaft 11 and race 24 results, tending to press the races 22 and 24 toward one another with greater force, thus increasing the traction between rollers and races, as the torque load, or resistance to rotation of the output shaft increases. Rollers 66 and 68 are held properly spaced and prevented from radial displacement by cage 70.

Rollers, as distinguished from balls, are used in the spring and torque loading device described because of the known superior load-carrying capacity of cylinders or like axially elongated bodies as compared with spheres of the same diameters. The use of rollers therefore permits a reduction of length in the transmission as compared with the use of balls of equal resistance to crushing pressure.

Since the surfaces 54 and 54a are flat and oblique to a plane normal to the axis, relative rotation of the race 24 and member 50 will cause a relative skewing of said surfaces with respect to each other and a faster axial separation or approach of zones on those surfaces further from the axis of rotation than of those nearer to said axis, according to the sense of rotation. If a cylindrical thrust roller be interposed between flat thrust surfaces one or both of which are oblique to the axis of relative rotation and to each other, line contact between the roller and the thrust surfaces occurs only when the portions of the surfaces contacting with the roller are parallel; that is, only for the zero position of the planes in which all lines in both perpendicular to the plane determining the degree of angularity are parallel. The instant that, under the influence of torque, the cooperating plane surfaces become skewed with respect to one another line contact disappears and full contact is transferred to the radially outermost end of the rollers resulting in excessive unit crushing loads. The surface of each roller 66 is therefore curved as shown in planes including the roller axis in an arc definitely calculated to maintain at all times a full uninterrupted contact area such that no portion of the zone of contact ever reaches the radially outer end zone of the roller.

Rollers 36 and 36a are maintained in predetermined relation to the other elements of the transmission by a fixed roller support or positioning means comprising two series of roller positioning arms 80 and 82 disposed radially with respect to the main axis. The arms 80 pertaining to one series are secured to the central tube 84 substantially midway between races 22 and 26. The arms 82 pertaining to the other series are secured to tube 84 substantially midway between races 24 and 26. Each series comprises preferably three arms equally spaced constituting spiders. In the embodiment illustrated arms 80 are rigid with a hub-like part 86 which is splined on tube 84 and fastened to it by screws 88 for convenience of assemblage. Arms 82 are rigid with a hub-like part 90 which may be integral with tube 84 but is shown as sleeved over and welded to it. Tube 84 is anchored to the housing 14 by means of one or more, preferably three, rigid arms 92 radiating from a central nave 94 shown as welded to the hub part 90 and to an annulus 96 secured to housing 14 as by bolts 98. Roller positioning arms 80 and 82 are composed of elastic material. They are relatively thin measured transversely in a plane normal to the main axis as compared with their dimensions measured transversely in an axial plane. These dimensions are proportioned to permit more or less yield of the elastic arms in response to input and output torque acting on the roller centers due to the rotation of the driving race. Inside the ends of tube 84 are centering bushings 100 spacing said tube from shaft 11, allowing free rotation of the latter within the tube and free passage of lubricating oil admitted through an oil tube 102.

Rollers 36 and 36a are mounted by intermediate trunnion parts on the ends of the elastic arms 80 and 82, respectively, so that they may rotate freely about the ends of said arms to transmit power from the driving race, the axes of power transmitting rotation of the rollers in their normal balanced relation intersecting substantially the main axis of the transmission, that is, the axis of shaft 11. The rollers are also so mounted on the elastic arms that they may tilt or otherwise move in directions to vary their paths of tractive contact with the races, and also be inclined in planes crossing the main axis for the purpose of initiating the tilting movement, which is accomplished automatically.

The trunnion parts referred to as intermediate of the elastic arms and rollers are similar in structure in each of the two roller series illustrated except that the oblique surfaces hereinafter described are reversely inclined in one series with respect to those in the other series. A description of the trunnion parts associated with one of the rollers 36a therefore suffices for all.

Referring to Figs. 1, 2, 3, and 7, numeral 110 indicates an arm one extremity of which is enlarged and bifurcated, the two limbs 112 of the bifurcated end receiving between them the extremity of an elastic arm 82 to which the arm 110 is pivoted by a pintle 114 seated in registering holes in elastic arm and limbs of arm 110. Therefore arm 110 may be inclined in a plane normal to the main axis and may be referred to as a ratio control arm. The opposite surfaces of limbs 112 that are transverse of the plane in which arm 110 is adapted to be inclined are parallel planes 116 somewhat oblique with respect to a plane including the axis of pin 114 and the main axis. A pair of parti-cylindrical trunnion blocks 118 having plane chordal surfaces are disposed with their plane surfaces in contact with said oblique surfaces 116 on the limbs of ratio control arm 110. Trunnion blocks 118 are freely slidable within limits on the surfaces 116. An annular bearing member 120 surrounds the trunnion blocks 118. Bearing annulus 120 is prevented from axial sliding movement with respect to the trunnion blocks by the stops 122 and 124. The annulus 120 is illustrated as a race for balls 126 interposed between it and roller 36a. The balls permit free rotation of the roller about its axis of power transmitting rotation but connect it to the race 120 and trunnion blocks 118 so that it partakes of their movements.

As clearly shown in Figs. 3 and 7 the oblique plane surfaces 116 on the limbs 112 of ratio control arm 110 are machined on widened flanges or ledges on said limbs the edges of said flanges being rounded. Also, as appears in Fig. 7 the blocks 118 are a little wider than the total width of the flanges. The contour of the flanges and their relative widths as compared with the width of the trunnion blocks permits sufficient free floating movement including freedom of rotation and lateral movement of the trunnion blocks, bearing ring and roller, on said oblique surfaces 116 for the purposes of this invention. The oblique surfaces 116 function to automatically restore the extended axis of the roller to a position in which said extended axis intersects the main axis, owing to the ratio changing movement of the roller after the roller has been inclined to initiate a change of ratio. Obviously the obliquity of the surfaces on the limbs of ratio control arms pertaining to the series of rollers 36 should be equal and opposite to that of the surfaces on the limbs of ratio control arms pertaining to rollers 36a illustrated in Fig. 7. Fig. 3 is a view of a ratio control arm pertaining to rollers 36.

That portion of a roller mounting which provides oblique surfaces 116, and therefore a tilting axis for the rollers slanted with respect to a plane normal to the axis of the races, for the purpose of automatically restoring the roller axis to a radial plane including the roller center and the axis of the races while the roller is tilting after the roller axis has been inclined to steer it to a new ratio position, is no part of my invention and forms the subject matter of the claims of patent to Ehrlich et al. No. 1,844,464, dated February 9, 1932. Without this automatic restoring means the roller axis could be restored to said radial plane after it had been inclined, by manipulation of lever 150 by the operator.

The ratio control arm adjusting or operating means whereby the arms 110 appertaining to all of the rollers 36 and 36a may be inclined in unison is now to be described. It consists of a tube 130 concentric with and rotatable on elastic-arm-carrying fixed tube 84, said tube 130 supporting at each end an operating wheel 132 and 134, respectively, one of which is connected to a manually operated means adapted to impart a limited rotation to said tube and wheels, the ratio control arms pertaining to one series of rollers having connection to one of the wheels and those pertaining to the other series of rollers having connection to the other wheel. Wheels 132 and 134 are each provided with spokes 136 and 138, respectively, angularly spaced about midway between the several elastic roller-positioning arms. The inner ends of the spokes 136 radiate from a ring-like center welded or otherwise fast to a hub-like sleeve 140 which is removably secured to sleeve 130 as by keys and screws 142 to facilitate assemblage. Spokes 138 of wheel 134 radiate from a central ring-like part which is shown as weld-united to the sleeve 130. The two wheels 132 and 134 may be die cut from sheet or plate steel. The outer ends of ratio control arms are interlocked loosely with the perimeters of wheels 132 and 134 in the same manner. Each arm 110 is shown provided with a lug 144 projecting from the end of the arm at right angles and extending into a peripheral notch in the rim of the wheel. For illustrative purposes lugs 144 of arms 110 associated with the series of rollers 36a interlock with wheel 134 by means of the notches 146 in its perimeter. A like connection exists between the lugs of ratio control arms associated with the series of rollers 36, except that the lugs that enter the notches of wheel 132 project in a sense opposite that of the lugs that connect similar arms to wheel 134. The type of connection shown and described permits any slight axial movement necessitated by variations of loading pressure on the races without disconnection of the lugs from the wheels and compensates for the different arcs of movement of the wheels and the ratio control arms during ratio adjusting movements.

As a conventional means for rotating slightly the wheels 132 and 134, in order to bring about a change of ratio, there is shown a hand lever 150 fulcrumed on a support 152 bolted to the housing. Lever 150 is linked to wheel 134 by link 154, and may be locked to or released from segment 156 by manipulating a friction locking device by means of the thumb latch 158. Within the range of adjustment permitted by the machine design the wheels may be moved by an infinite gradation of steps to effect an infinite number of ratio changes within the limits imposed. This hand operable means for effecting ratio change is no part of my invention and is disclosed in patent to Ehrlich et al. #1,844,464 dated February 9, 1932.

Central race 26, which is the driving race in the illustrated embodiment, and has been said to be rotatable with respect to shaft 11, is mounted on a suitable bearing bushing 160 sleeved over the angularly movable tube 130 of the ratio control train. The fixed tube 84, which supports the radiating roller positioning arms 80 and 82, is provided with one or more oil holes 162. Smaller oil holes in tube 130 and bushing 160 register with it. The hole 162 is large enough to permit the necessary rotative movement of tube 130 without closing said hole. Where oil tube 102 passes through tube 130 the opening in the latter is of extent sufficient to permit the necessary amplitude of rotative movement of tube 130 with respect to tube 84. Oil forced into oil tube 102 flows freely into the space between shaft 11 and tube 84, lubricating the bearing surfaces between shaft 11 and bushings 100, the surfaces between tubes 84 and 130 and between the bearing surfaces of race 26 and bushing 160. Adequate lubrication of other parts is provided by splash of oil within the housing.

Operation

Assuming torque to have been applied to power input shaft 10, as by an internal combustion engine running in a clockwise direction viewed from the left of Fig. 1, race 26 will be rotated in the same direction at the same speed. Rotation will be thereby imparted through the transmission rollers 36 and 36a to races 22 and 24 and through them to output shaft 11 in a counterclockwise direction. Assuming rollers 36 and 36a to be in the position illustrated in Fig. 1, tracking on all races at equal distances from the main axis and having their axes of power transmitting rotation lying in planes intersecting the roller centers and the main axis, shaft 11 will rotate continuously at the same speed as shaft 10 or at a 1:1 ratio. The rollers will be maintained in tractive contact with the races by the spring loading devices. Increase of torque load on shaft 11 will cause increase of pressure between races and rollers through the action of the torque loading devices.

In order to change the relative speeds of shafts 10 and 11 it is necessary to change the angle of the roller axes in planes intersecting the roller centers and the main axis, that is, to tilt the rollers in that plane so that their paths of contact on the driving race will be at different distances from the main axis than their paths of contact on the driven races. Any attempt to effect this tilting of the rollers directly by sliding the contacting points or areas on the raceways to the desired position would be resisted by a very considerable friction due to the pressure of the loading devices necessary to secure adequate traction. The rolls may, however, be inclined readily about an axis intersecting their points of peripheral contact with the raceways; and when so inclined they will automatically change their ratio positions in response to the inherent driving forces during the operation of the transmission.

The small force necessary to incline the rollers may be exerted on the hand lever 150 and by it transmitted to wheel 134. When wheel 134 moves angularly the tube 130 and wheel 132 move angularly an equal extent. As wheels 132 and 134 are connected to the ends of ratio control arms 110 the consequence of their angular movements is an inclination of all of the arms 110 and an equal inclination of all of the rollers. The rollers will now begin to tilt into a new ratio-position by rolling in spiral paths on the raceways. They are free to execute this movement under the inherent driving forces by reason of the fact that the trunnion blocks 118, which are rigid with the bearing rings 120, slide and rotate freely on the surfaces 116 of ratio control arms. By reason of the inclinations of the surfaces 116 and their relative senses of inclination the rollers tilt on axes inclined to the center planes of the races in the center planes of the rollers. This inclination of the tilting axis effects restoration of each roller axis to the plane which includes the roller center and the main axis, due to the tilting movement of the roller consequent upon the inclination imparted to it and its axis for initiating ratio change.

In the exemplary mechanism illustrated, a clockwise movement (as viewed from the left of Fig. 1) imparted to the ratio control arms operating means will incline all of the rollers clockwise. They will begin to spiral on the raceways and effect a tilt of the rollers in a direction to cause the rollers to contact with the raceways of the driving race in paths further from the main axis and on the raceways of the driven races on paths nearer to the main axis, thereby increasing the speed of the power output shaft relative to that of the power input shaft. The extent of tilting movement will depend on the extent of inclination imparted to the rollers and roller axes. Counter clockwise movement of the ratio control arms operating means will cause the rollers to incline in the opposite sense whereupon they tilt to a position in which they will drive the power output shaft at a decreased speed with respect to the power input shaft.

Should any roller from any cause get into a position in which it carries more load than the others, that is, to a position in which it tends to drive the output shaft at a higher speed, the elastic arm to which its ratio control arm is pivoted will yield in the direction of the resultant of the forces acting upon its center. The yield will be in a clockwise direction, and as a result the arm 110 will be inclined in a direction to incline the roller counter clockwise whereupon the inherent forces will cause it to spiral to a position in which it tends to deliver a lower output speed,— all as illustrated in Fig. 2.

Extension of the ratio control arms 110 outward from the pivots 114 at the extremity of the radial positioning arms 80 and 82, as illustrated, instead of inward therefrom, has the utility of bringing into effect, in case of displacement of a roller due to unequal distribution of the load among the rollers, a force tending to incline it in a sense adapted to steer it into position wherein it carries a lesser load. This is useful whether or not the radiating supporting arms are made intentionally elastic, since any structure is liable to yield under excessive load.

Although a specific exemplary embodiment of the invention has been illustrated and specific terms have been used to describe it, it is not thereby intended to limit the invention to a specific structure illustrated by way of example, or that terms of description shall be taken as terms of limitation of the scope of the invention which is defined in the following claims.

I claim:

1. The combination of two power transmitting members comprising a race and a roller; elastic means yieldable in response to the tractive force applied to the roller for positioning the roller with its periphery in tractive engagement with one face of the race and its axis of power transmitting rotation normally in a plane including the roller center and the race axis, said roller being freely movable to vary its path of tractive contact with the race; and external control means, responsive to any yielding movement of the roller positioning means causing displacement of the roller axis out of said plane, effective to incline said roller and roller axis in a sense that will cause said roller to assume a position wherein it transmits a lower output speed.

2. A combination as defined in claim 1 in which the elastic means for positioning the roller consists of an arm disposed radially with respect to the axis of said race.

3. A combination as defined in claim 1 in which the external control means effective to incline the roller in response to a yielding movement of the elastic means for positioning the roller comprises a roller trunnion pivoted to the means for positioning the roller and connected to a body at a point radially outward thereof.

4. A combination as defined in claim 1 in which the roller positioning means consists of an elastic arm extending radially outward from the axis of the race, and the external control means effective to incline the roller comprises a roller trunnion pivoted to the outer extremity of said positioning arm, said trunnion having a ratio control arm connected to a body at a point radially outward of the trunnion pivot.

5. A combination as defined in claim 1 in which the external control means effective to incline the roller comprises a roller trunnion pivoted to the means for positioning the roller, a ratio control arm extending radially outward from said trunnion, and an adjustable ratio-control-arm operating means connected to said arm.

6. The combination of a shaft, a race rotatable about the axis of said shaft, rollers having power transmitting connection with the shaft; means for positioning the rollers with their peripheries in tractive contact with one face of the race and their axes of power transmitting rotation normally in planes including the roller centers and the race axis, said means consisting of a spider having radiating elastic arms; roller supporting inclinable trunnions pivoted to said elastic arms; ratio control arms extending radially outward from said trunnions; and a ratio-control-arm adjusting means to which said ratio control arms are connected, said rollers being free to move on said trunnions into new ratio positions.

7. A combination as defined in claim 6, in which the ratio control arms are connected to the adjusting means by a pivotal connection permitting slight relative movement in an axial direction, and which includes in addition loading means for forcing the races and rollers into efficient rolling contact.

8. The combination of a housing; two power-transmitting axially alined shafts; two spaced apart races in driving connection with one of said shafts; a race interposed between said spaced apart races in driving connection with the other shaft; two series of rollers in peripheral tractive engagement with said interposed and spaced-apart races; positioning means for the rollers consisting of a tube surrounding one of said shafts extending through said interposed race and provided with a series of elastic positioning arms radiating from each end; means for anchoring the positioning means to the housing; roller trunnions pivoted to the elastic positioning arms, said rollers being free to move on said trunnions into new ratio positions, ratio control arms extending radially outward from the trunnions; a ratio-control-arm operating device comprising an oscillatable tube concentric with the fixed tube of the roller positioning means and a spoked wheel having pivotal connections with the ratio control arms fixed to each end of said oscillatable tube; and means to adjust the ratio-control-arm operating device and to fix it in any desired adjusted position.

9. A combination as defined in claim 8 wherein the tube of the ratio-control-arm operating device surrounds the tube of the roller positioning means and serves as a bearing for said interposed race.

10. In a friction transmission mechanism a race, a roller, means comprising a transversely elastic arm for positioning the roller with its periphery in tractive engagement with one face of the race, and means rendered effective by yielding of the elastic arm to driving torque to incline the roller in a sense that will effect a reduction in the ratio of output to input speed.

11. In a friction transmission mechanism, spaced apart coaxial driving and driven races, interposed rollers in peripheral tractive engagement with the opposed faces of said races, roller positioning means including a spider having transversely elastic arms radiating from the race axis, means for mounting the rollers on the radiating arms so that they are free to rotate around their axes of power transmitting rotation and free to vary their paths of tractive contact with the races, and means rendered effective by yielding of the elastic arm to driving torque to incline the rollers in a sense that will cause them to follow a path on the driving race nearer the center thereof.

12. In a friction transmission mechanism axially alined power transmitting members including a shaft, two spaced apart races in driving connection therewith, and a race rotatable about said shaft intermediate said two spaced apart races; two series of rollers between said intermediate race and said two spaced apart races; roller positioning means including a fixed tube surrounding said shaft and passing through said intermediate race; elastic arms radiating from each end of said tube; means for mounting the rollers on the radiating arms so that they are free to rotate around their axes of power transmitting rotation and free to vary their paths of tractive contact with the races, and means responsive to yielding of any elastic arm to driving torque adapted to incline the roller in a sense that will cause it to follow a path in the driving race nearer the center thereof.

WINFIELD D. COVE.